H. L. LEVERETT.
BREATHER FOR TRANSMISSION CASES.
APPLICATION FILED SEPT. 4, 1919.
1,365,836.
Patented Jan. 18, 1921.
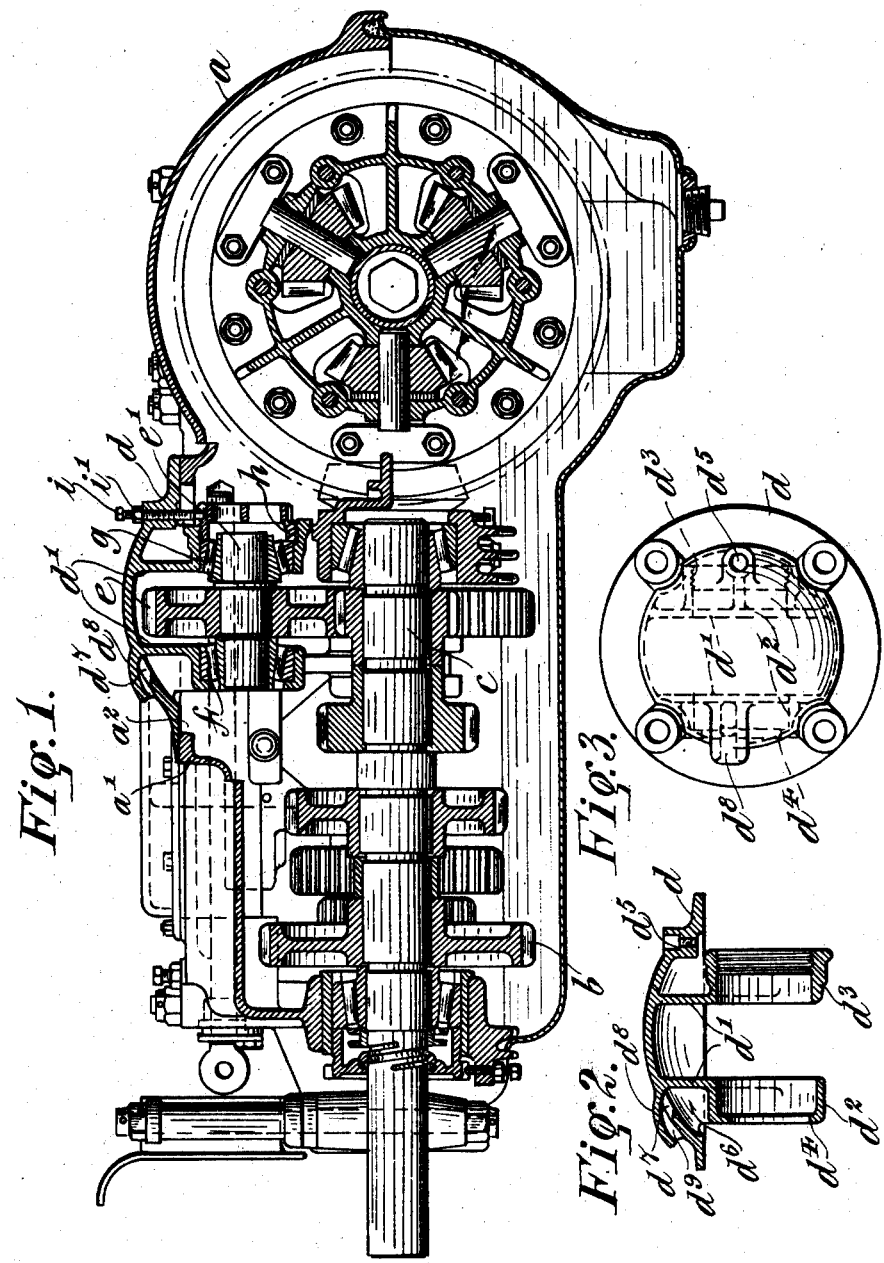

UNITED STATES PATENT OFFICE.

HARRY L. LEVERETT, OF NEW YORK, N. Y., ASSIGNOR TO INTERNATIONAL MOTOR COMPANY, OF NEW YORK, N. Y., A CORPORATION OF DELAWARE.

BREATHER FOR TRANSMISSION-CASES.

1,365,836.   Specification of Letters Patent.   Patented Jan. 18, 1921.

Application filed September 4, 1919. Serial No. 321,709.

*To all whom it may concern:*

Be it known that I, HARRY L. LEVERETT, a citizen of the United States, residing in the borough of Manhattan, of the city of New York, in the State of New York, have invented certain new and useful Improvements in Breathers for Transmission - Cases, of which the following is a specification, reference being had to the accompanying drawing, forming a part hereof.

The need for a closed casing in which moving elements run in oil is recognized, but the difficulties of providing a suitable breather which will relieve the high internal pressures, prevent the oil from finding its way out of the case, and satisfy manufacturing considerations, have led to the employment of many different devices, none of which can be said to satisfy the requirements indicated. The problem becomes especially great in transmission cases where the moving parts are confined within the smallest possible space and the liability of the escape of oil through the breather is correspondingly increased. Further, from the manufacturer's standpoint, it is unsatisfactory to provide a separate attachment as a breather which must be mounted in a case especially designed to receive it. The object of the present invention is to form a breather for a transmission case directly in the support for the reverse idler gear, this support lending itself admirably to this additional function by reason of the character of the casting and the position in which it is normally mounted in the case with relation to the moving parts and the body of oil. In accordance with the invention there is provided a construction in which the transmission case receives the support for the reverse idler gear in its upper wall and this support is of such improved construction as to afford an adequate breather for the entire case and yet offer baffling surfaces which will effectively prevent the escape of oil through the breather. The invention, therefore, has two aspects, one of which is concerned with the support for the reverse idler, as a new article of manufacture, this support serving as a breather, and the other of which is concerned with the combination in a transmission case of a support for a reverse idler mounted in such relation to the elements of the transmission and to the oil as to prevent the oil from finding its way to the breather. Reference is now to be had to the accompanying drawing for a detailed description of the preferrred embodiment of the invention, in which drawing—

Figure 1 is a view in vertical section taken longitudinally through a gear case provided with the improved reverse idler support.

Fig. 2 is a detail view in vertical section of the improved support.

Fig. 3 is a view in plan thereof.

The casing $a$, which may be sectional, as usual, has supported therein change-speed gears $b$ carried on one or more shafts $c$. The invention is not concerned with the particular type of transmission employed. In the top wall of the transmission case $a$ is formed an upwardly extending wall $a'$ which terminates in an opening $a^2$ adapted to be closed by the improved support $d$ for the reverse idler gear $e$. This support $d$ is of general dome shape, its relation to the upwardly extending wall $a'$ being such as to permit the gear $e$ to be supported above all of the other gears, the top wall of the support $d$ being relatively remote from the moving elements within the casing and from the oil at the bottom thereof.

The improved support $d$ has cast therewith webs $d'$ which extend downwardly and carry annular flanges $d^2$, $d^3$ in which are supported suitable bearings $f$, $g$ for the shaft $e'$ of the reverse idler gear $e$. One of the bearings $f$ for the shaft $e'$ may be positioned against a shoulder $d^4$ formed at one side of the annular flange $d^2$, the position of both bearings $f$, $g$ being determined by an adjusting ring $h$ threaded in the annular flange $d^3$. The adjusting ring $h$ may be locked in place by means of a set screw $i$ threaded in an opening $d^5$ formed therefor through the top wall of the support $d$. A lock nut $i'$ is carried on the set screw $i$ to hold the screw releasably in set position. One of the downwardly extending webs $d'$ has formed therein a channel $d^6$ which is disposed directly above one of the annular flanges $d^2$, this channel communicating with the interior of the casing through a somewhat limited space left between the edge of the annular flange $d^2$ and the adjacent overhanging wall of the reverse idler support $d$. This channel by reason of its formation becomes somewhat tortuous in its character for a reason which will appear later. At the upper end of the channel $d^6$ in the idler support $d$ is formed a port $d^7$ which is covered by a hood $d^8$ cast in the support. This hood is of such length as to form with the wall of the reverse idler support $d$ another channel $d^9$ which communicates with the atmosphere and with the port $d^7$. The channels just described constitute a circuitous path from the atmosphere to the interior of the casing. The resulting construction is a breather. By reason of the disposition of the reverse idler support and its conformation the breather is disposed at a point relatively remote from the moving elements within the casing and the body of oil so that there is, in fact, comparatively little oil spray at that section of the casing and consequently comparatively little seeks to find its way out from the breather. What little oil there is at this point is prevented from escaping through the breather by reason of its peculiar construction and the trapping of such oil as reaches the breather in the pocket $d^6$.

The entire construction described so far as concerns the support for the reverse idler, the breather and the method of holding the bearings $f$, $g$ adjustably in position is very simple and inexpensive and satisfies all manufacturing considerations. In use, the breather is effective to prevent the escape of oil and yet to relieve the pressures within the casing. The reverse idler support $d$ with the reverse idler gear and bearings may be removed as a unitary structure permitting ready access to the interior of the casing.

I claim as my invention:

1. A one-piece support for a gear comprising a plate formed with integral webs to receive bearings for the gear and with a breather opening cast in the plate above the support for the bearings and a hood on the plate over the opening.

2. A support for an idler gear comprising a plate, webs carried therewith to receive bearings for the gear, one of said webs having a channel cast therein and the plate having an opening formed therein at the end of the channel, and a hood carried on the plate over the opening.

3. A support for an idler gear comprising a dome-shaped plate, webs carried therewith to receive bearings for the gear, one of said webs having a channel cast therein and the plate having an opening formed therein at the end of the channel, a hood carried on the plate over the opening, a bearing ring adjustably supported in said webs to lock the bearings in place and a lock screw for said adjusting ring mounted in the dome-shaped plate.

This specification signed this 29th day of August, 1919.

HARRY L. LEVERETT.